June 19, 1934.   C. J. RHODES   1,963,248
MACHINE FOR REFORMING CAN OR RECEPTACLE BODIES
Filed March 15, 1932   3 Sheets-Sheet 1

Inventor:
Charles Joseph Rhodes
By Harold D. Penney Atty.

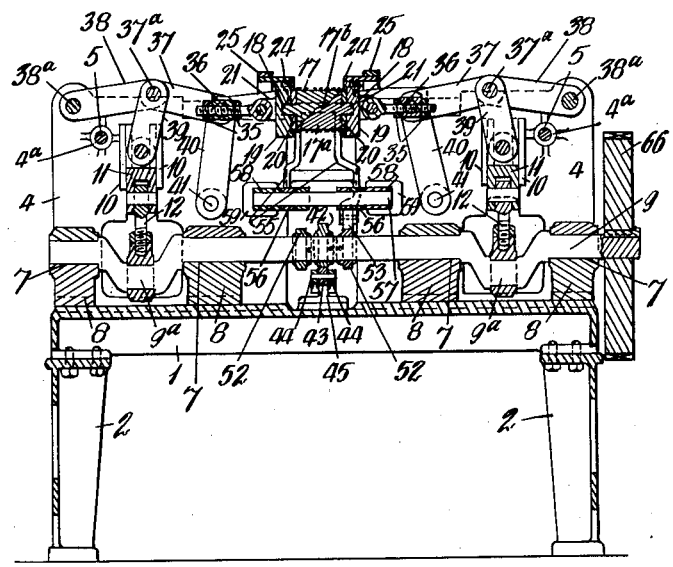

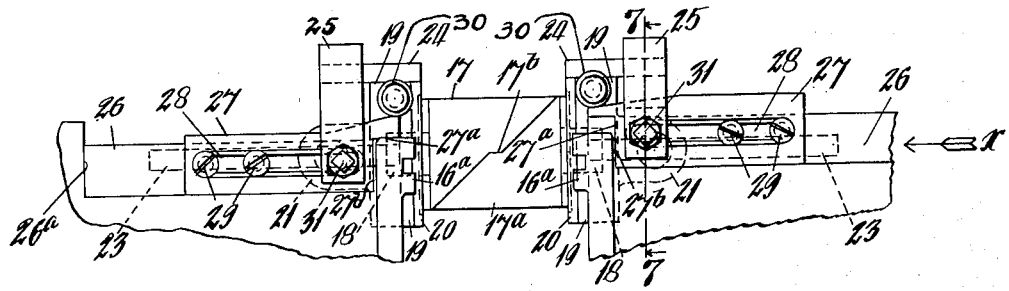
Fig. 5.
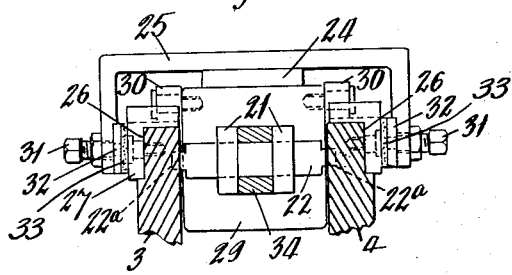
Fig. 6.
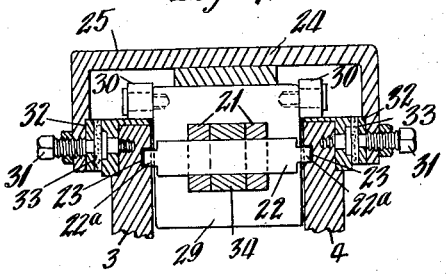
Fig. 7.
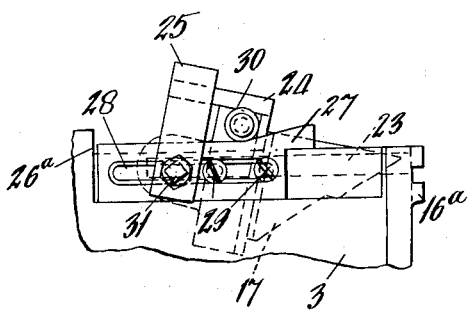
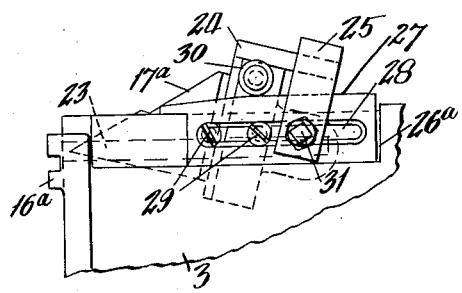
Fig. 8.
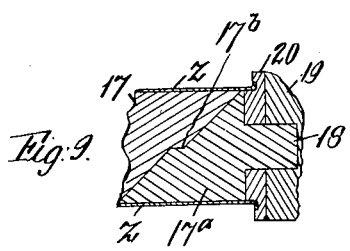
Fig. 9.
Inventor:
Charles Joseph Rhodes.
By Harold D. Penney  Atty.

Patented June 19, 1934

1,963,248

UNITED STATES PATENT OFFICE 1,963,248

MACHINE FOR REFORMING CAN OR RECEPTACLE BODIES

Charles Joseph Rhodes, Wakefield, England

Application March 15, 1932, Serial No. 598,928
In Great Britain July 4, 1931

27 Claims. (Cl. 153—32)

This invention relates to an improved machine for expanding collapsed tin cans or other receptacles formed of sheet metal.

In order to facilitate the production of tin cans in countries or places where owing to lack of skilled labour or other reasons, the manufacture of the complete article is costly or can only be accomplished with difficulty, it has been proposed to manufacture the bodies of the cans elsewhere and then transport them to the place where the cans are required and where manufacture is completed.

As, however, the bodies of the cans in bulk occupy considerable space, the cost of transport is comparatively heavy.

It has, therefore, been proposed to first flatten or collapse the bodies for transport, and, when they reach their destination, to expand them to restore them to the circular or other form, after which the ends or closures are applied in the usual manner, the body, if desired, being flanged so that the ends may be seamed thereon.

The primary object of the invention is to provide simple and efficient apparatus by means of which the collapsed or flattened can bodies may be rapidly restored to their circular or other form, and comprising wedge shaped or substantially wedge shaped bodies designed to enter the collapsed can bodies from opposite ends thereof and co-operate to expand the same to the desired shape.

Another object of the invention is to provide apparatus by means of which the collapsed or flattened can bodies can be restored to their original form by means of wedge shaped bodies in the manner above described and by means of which apparatus the can bodies may be flanged preparatory to the attachment of the ends.

A further object of the invention is to provide means for operating the aforementioned wedge shaped bodies, for automatically feeding the collapsed can bodies into position to be operated upon by the said wedge shaped bodies and means whereby the said can bodies are delivered from the apparatus.

Numerous further objects will be apparent from the following specification and claims.

In the accompanying drawings, which form a part of the present specification, is illustrated one embodiment in which the invention may appear.

Fig. 3 is a longitudinal section on line 3—3 Fig. 2.

Fig. 4 is a transverse section on line 4—4 Fig. 1.

Fig. 5 is a fragmentary view showing certain details.

Fig. 6 is a view as seen when looking in the direction of the arrow $x$ Fig. 5.

Fig. 7 is a transverse section on line 7—7 Fig. 5.

Fig. 8 is a similar view to Fig. 5, but showing certain of the parts in a different position.

Fig. 9 is a fragmentary sectional view showing more clearly a certain detail.

Figure 1:
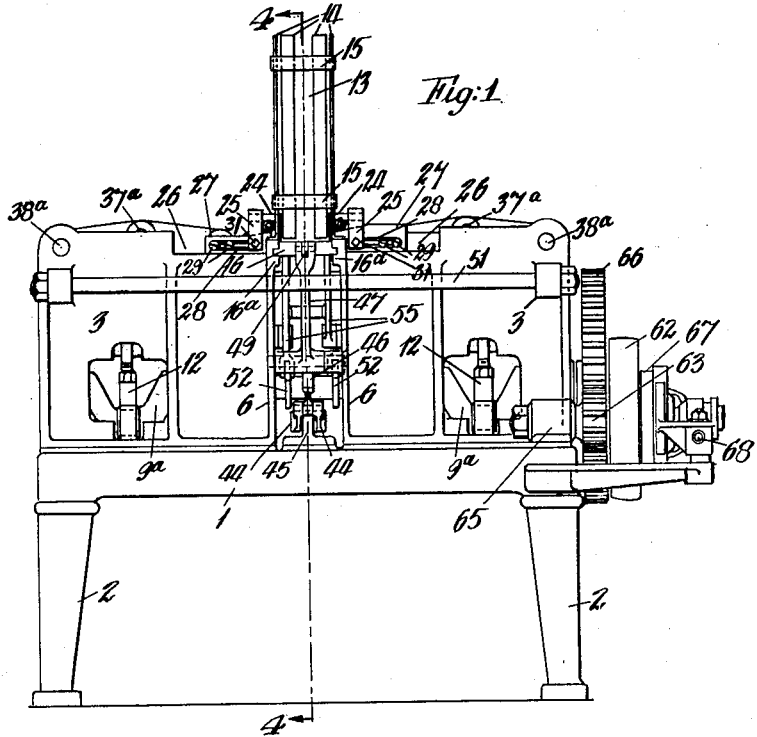
Fig. 1 is a front elevation of a machine according to one form of the present invention.

Referring to the accompanying drawings 1 indicates the base of the machine which is mounted at each end upon legs 2.

Mounted at each end of the base and upon the upper surface thereof are brackets 3, 4, arranged in spaced relationship one to the other and provided with inwardly extending bosses $3^a$, $4^a$, respectively through which passes a bolt 5 which serves to so connect the said brackets that a rigid structure is thereby formed. Each of the brackets 3 is provided with an outwardly and laterally extending portion or wall 6.

Extending longitudinally of the base and carried in bearings 7 formed in brackets 8 mounted upon the said base is a shaft 9 provided at a point near each of its ends with a cranked portion $9^a$.

Formed integral with the opposing faces of each of the brackets 3, 4, are lugs 10 which are suitably machined to form guideways for vertically reciprocating cross-heads indicated by 11, these cross-heads being connected to the cranks $9^a$ by means of adjustable connecting-rods 12.

Mounted above the middle portion of the base is a vertically disposed magazine 13 which is of rectangular cross section and is formed of strips 14 which are secured at points near their upper and lower ends to the inside of rectangular frames 15. The magazine is mounted, by means of outwardly turned portions provided at the lower ends of certain of the strips 14, upon the upper edges of the aforementioned walls 6, which latter are in spaced relationship and parallel one to the other. Located immediately beneath the magazine 13 is a horizontally disposed plate or slide 16 provided with an undercut portion upon which the lowermost can of a pile of flattened cans, stacked one upon the other within the magazine, normally lies, the said slide itself being supported between channelled lugs $16^a$ formed upon the faces of the walls 6.

The means for opening the cans is in the form of a composite circular mandrel formed of superposed wedge shaped parts 17, $17^a$, which are designed to fit together as shown in Figs. 3, 4 and 5, and are provided at their outer ends with bosses 18 by means of which they are each secured to a rectangular block 19 of somewhat larger cross sectional dimensions than the mandrel.

Interposed between the outer ends of the parts 17, 17ª and the blocks 19 are plates 20 suitably recessed around the ends of the said parts, as shown more clearly in Fig. 9, for the purpose of turning over or flanging the ends of the bodies in a manner to be hereinafter described.

Formed upon the outer face of each of the blocks 19, as shown more clearly in Fig. 6 is a pair of lugs 21 arranged in spaced relationship and bored to form bearings for a spindle 22 which is provided with squared outer ends 22ª designed to slidingly engage with horizontally disposed slots 23 formed in the walls of the brackets 3, 4, between which the said blocks are thus pivotally and slidably supported.

Mounted upon the upper edge of each of the blocks 19 is a plate 24 the outer end of which is secured to the underside of the horizontal member of a body 25 of substantially inverted U shaped outline.

The upper part of each of the brackets 3, 4, is provided with a horizontally extending undercut portion or recess 26 extending to the upper edge thereof.

27 indicates bodies of substantially inverted L shaped cross section the vertical portions of which are slotted longitudinally as at 28. The bodies 27 are slidably mounted, within the undercut portions 26 by means of screws 29, which pass through the slots 28 into the walls of the respective brackets 3, 4, the said slots being also suitably undercut to accommodate the heads of the screws. The upper or horizontal portions of the bodies 27 extend over the upper edges of the brackets 3, 4, as shown in Figs. 6 and 7.

Provided upon each side of the blocks 19 is a roller 30 which engages with the upper surface of the adjacent body 27, and adjustably mounted by means of a bolt 31 upon the inside of each of the lower ends of the vertical limbs of the U shaped bodies 25 is plate 32 carrying a block of material 33 having a more or less high co-efficient of friction and bearing upon the outer face of the vertical member of the body 27.

Figure 2:
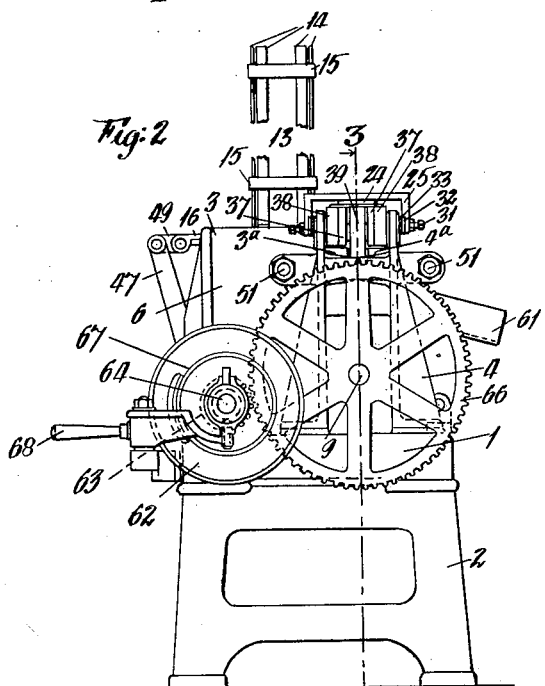
Fig. 2 is an end view.

Pivoted upon each of the spindles 22 and the disposed between the lugs 21 is the inner end of a shackle bolt 34 the outer end of which is adjustably connected by means of nuts 35 to the middle point of a transverse member 36 pivoted at its ends between the inner ends of a pair of links 37, Figs. 1, 2 and 3. The links 37 at their outer ends, are connected by means of a spindle 37ª to links 38 pivoted upon a spindle 38ª carried in bearings formed in the brackets 3, 4. Pivoted at the point of interconnection of the links 37, 38, are the upper ends of links 39 the lower ends of which are connected to the aforementioned cross-heads 11, the arrangement forming a toggle lever system to which motion is imparted from the shaft 9 to cause the reciprocation of the parts 17, 17ª toward and away from each other.

The inner end of each of the links 37 is pivotally connected to a supporting link 40 pivotally mounted as at 41 Fig. 3 upon the respective brackets 3 and 4.

The blocks 19 are supported by means of the rollers 30 in such a manner that the parts 17, 17ª move together, as shown in Fig. 1, the said rollers bearing upon the bodies 27 as above described.

Upon reference to Fig. 8 it will be seen that when the parts 17, 17ª are entirely separated one from the other the reduced ends of the wedge shaped bodies have moved into horizontal alignment due to the blocks 19 being pivoted about the spindles 22, both the said blocks having moved in a clockwise direction.

This pivotal movement is effected by upwardly inclining the inner portions of the bodies 27 with which engage the rollers 30 associated with the block 19 carrying the part 17 and downwardly inclining the corresponding portions of the bodies 27 with which cooperate the rollers mounted upon the block carrying the part 17ª, as shown more clearly in Figs 5 and 8.

The aforementioned slide 16 is caused to move between the parts 17, 17ª when these are separated as shown in Fig. 8 and carry the lowermost can body (indicated by Z in Fig. 4) into position between the inner extremities of the said parts which then move forward and enter the said body, whilst the slide returns to its normal position.

The forward movement of the slide 16 is effected by means of a cam 42 mounted upon the shaft 9, which cam engages with a roller 43 mounted upon a rearwardly and upwardly inclined lever 44 pivoted at its forward end to a bracket 45 mounted upon the base 1, and operably connected at its rear end to the slide by means comprising an adjustable link 46, a bell crank lever 47 mounted upon a shaft 48 carried between the walls 6, and a link 49. The rearward movement of the slide is effected by means of a spring 50 extending between the lever 44 and the rearmost bar of a pair of longitudinally extending tie bars 51 rigidly connecting the brackets 3, 3 and 4, 4 respectively.

The parts 17, 17ª after having entered the opposite ends of the can body move toward each other and into the position shown in Fig. 3, thus fully opening the said body, the distance between the blocks 19 when the parts 17, 17ª occupy this position being slightly less than the original length of the collapsed can body to thus cause the ends of the said can body to enter the recesses 20 and be flanged.

Mounted upon the shaft 9 and upon each side of the cam 42 is a cam 52 which co-operates with a roller 53 mounted upon an extension or lug 54ª of a body 55 pivoted by means of bosses 56 upon a shaft 57 mounted at each end in bearings 58 formed in brackets 59 carried between the brackets 3, 4, there being two such bodies 55 mounted upon the said shaft and so arranged that their horizontally disposed upper ends 60 are moved by the respective cams 52 into contact with the can body when the parts 17, 17ª have moved into the positions shown in Figs. 3 and 4.

The object of the arrangement just described is to cause any trace of the original lateral creases or folds to be removed from the can body just prior to the flanging operation taking place.

After the lateral creases have been removed from the can body as above described the parts 17, 17ª are moved apart and thus withdrawn from the said body which then falls onto an inclined chute 61 down which it rolls out of the machine.

It is essential that the parts 17, 17ª be withdrawn in an axial direction from the opened can body instead of in the manner in which they entered the latter when it was in the collapsed condition, as otherwise the said body would be damaged or deformed.

The function of the aforementioned blocks 33 is to cause this straight withdrawal by causing the bodies 27 to be thereby gripped and drawn rearwardly along the aforementioned undercut portions 26, of the brackets 3, 4, for a sufficient distance to prevent relative movement between the rollers 30 and the bodies 27 during the withdrawal, or the major portion thereof, of the parts 17, 17ª from the can body.

Relative movement between the rollers 30 and bodies 27 is finally caused to take place during the outward movement of the parts 17, 17ª due to the resistance between the blocks 33 and bodies 27 being overcome by the outer ends of the said bodies 27 coming into contact with the outer walls 26ª of the recesses 26.

As the parts 17, 17ª commence to move toward each other again, obviously no relative movement between the rollers 30 and bodies 27 takes place until the inner walls 27ª of the recessed inner ends of the said bodies 27 come into contact with the inner walls 26ᵇ of the recesses 26.

62 indicates the driving pulley of the machine, which together with a pinion 63 is freely mounted upon a shaft 64 carried at its inner end by a bracket 65 mounted upon the base 1, the pinion 63 engaging with a second pinion 66 secured upon the outer end of the shaft 9, a clutch, indicated generally by 67, being provided which is operable by means of a handle 68 for throwing the clutch into engagement to cause the said driving pulley to be operably connected to the pinion 63, and thereby drive the machine.

For the purpose of causing the parts 17, 17ª to move co-axially in a horizontal direction as the container becomes fully expanded and thus permit of the flanging operation taking place without the said container being damaged, as would be the case if these parts were to move obliquely during this operation, each of the inclined faces of the bodies 17, 17ª is stepped as indicated at 17ᵇ.

While the form of embodiment of the invention as herein disclosed constitutes a preferred form, it is to be understood that other forms might be adopted, all coming within the scope of the claims which follow.

What is claimed is as follows:—

1. Apparatus for expanding collapsed sheet metal bodies to a predetermined cross-sectional outline, for the purpose specified, comprising a mandrel having substantially wedge shaped members the points of which are designed to simultaneously enter the opposite ends of the collapsed bodies so that said members may co-operate to completely fill said bodies whereby to expand same to the desired outline.

2. Apparatus for expanding collapsed sheet metal bodies to a predetermined cross-sectional outline, for the purpose specified, comprising a mandrel having substantially wedge shaped members the points of which are designed to simultaneously enter the opposite ends of the collapsed bodies so that said members may co-operate to completely fill said bodies whereby to expand same to the desired outline, and means for flanging the said expanded bodies preparatory to the attachment of the ends thereto.

3. Apparatus for expanding collapsed sheet metal bodies to a predetermined cross-sectional outline, for the purpose specified, comprising: a mandrel having substantially wedge shaped members the points of which are designed to simultaneously enter the oposite ends of the collapsed bodies so that said member may co-operate to completely fill said bodies whereby to expand same to the desired outline, together with means for automatically feeding the said collapsed bodies into position to be operated upon by said members, and means whereby the expanded bodies are delivered from the apparatus.

4. Apparatus for expanding collapsed sheet metal bodies to a predetermined cross-sectional outline, for the purpose specified, comprising: a mandrel having substantially wedge shaped members the points of which are designed to simultaneously enter the opposite ends of the collapsed bodies so that said member may co-operate to completely fill said bodies whereby to expand same to the desired outline; means for flanging the said expanded bodies preparatory to the attachment of the ends thereto; means for automatically feeding the collapsed bodies into position to be operated upon by said members, and means whereby the expanded bodies are delivered from the apparatus.

5. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; means for moving said members toward and away from each other; means whereby the sharp points of said members are maintained in a plane coincident with the interior plane of the collapsed hollow bodies until said members contact with one another; means for permitting and controlling the movement of said wedge shaped bodies after said contact has taken place; and means for maintaining said members in axial alignment during their withdrawal from the expanded bodies.

6. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; means for moving said members toward and away from each other; means whereby the sharp points of said members are maintained in a plane coincident with the interior plane of the collapsed hollow bodies until said members contact one with another; means for permitting and controlling the movement of said wedge shaped members after said contact has taken place; means for flanging the expanded bodies preparatory to the attachment of the ends thereto; and means for maintaining said members in axial alignment during their withdrawal from said expanded bodies.

7. Apparatus for expanding collapsed hollow metal bodies to a predetermined cross-sectional outline for the purpose specified, comprising: substantially wedge shaped members designed to enter the opposite ends of the collapsed bodies and co-operate to expand same to the desired outline; means for moving said members toward and away from each other; means whereby the sharp points of said members are maintained in a plane coincident with the interior plane of the collapsed hollow bodies until said members contact one with another; means for permitting and controlling the movement of said wedge shaped bodies after said contact has taken place; means for automatically feeding the collapsed bodies into position to be operated upon by said members; means for maintaining said members in axial alignment during their withdrawal from the expanded bodies; and means whereby the expanded bodies are delivered from the apparatus.

8. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; means for moving said members toward and away from each other; means whereby the sharp points of said members are maintained in a plane coincident with the interior plane of the collapsed hollow bodies until said members contact one with another; means for permitting and controlling the movement of said wedge shaped members after said contact has taken place; means for flanging the expanded bodies preparatory to the attachment of the ends thereto; means for automatically feeding the collapsed bodies into position to be operated upon by said members; means for maintaining said members in axial alignment during their withdrawal from the expanded bodies; and means whereby the expanded bodies are delivered from the apparatus.

9. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; and means for intermittently operating said cams for this purpose.

10. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; frictional means operatively connecting said blocks to said cams; and means for limiting the movement of said cams to cause said rollers to intermittently move thereon.

11. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; means for intermittently operating said cams for this purpose; and means for flanging the expanded bodies preparatory to the attachment of the ends thereto.

12. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; frictional means operatively connecting said blocks to said cams; means for limiting the movement of said cams to cause said rollers to intermittently move thereon; and means for flanging the expanded bodies preparatory to the attachment of the ends thereto.

13. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; means for intermittently operating said cams for this purpose; means for automatically feeding the said collapsed bodies into position to be operated upon by said members; and means whereby the expanded bodies are delivered from the apparatus.

14. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to cooperate with said rollers to control the entry of said members into the collapsed bodies and ensure and permit of their withdrawal from the expanded bodies co-axially with respect thereto; frictional means operatively connecting said blocks to said cams; means for limiting the movement of said cams to cause said rollers to intermittently move thereon; means for automatically feeding the said collapsed bodies into position to be operated upon by said members; and means whereby the expanded bodies are delivered from the apparatus.

15. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; means for intermittently operating said cams for this purpose; means for flanging the expanded bodies preparatory to the attachment of the ends thereto; means for automatically feeding the said collapsed bodies into position to be operated upon by said members; and means whereby the expanded bodies are delivered from the apparatus.

16. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; frictional means operatively connecting said blocks to said cams; means for limiting the movement of said cams to cause said rollers to intermittently move thereon; means for flanging the expanded bodies preparatory to the attachment of the ends thereto; means for automatically feeding the said collapsed bodies into position to be operated upon by said members; and means whereby the expanded bodies are delivered from the apparatus.

17. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; means for intermittently operating said cams for this purpose; means, carried upon said members, for flanging the expanded bodies preparatory to the attachment of the ends thereto; and means for causing the said members to move co-axially with the expanded can bodies during the flanging operation.

18. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; frictional means operatively connecting said blocks to said cams; means for limiting the movement of said cams to cause said rollers to intermittently move thereon; means carried upon said members for flanging the expanded bodies preparatory to the attachment of the ends thereto; and means for causing said members to move co-axially with the expanded can bodies during the flanging operation comprising contacting surfaces disposed in a plane coincident with the longitudinal axis of said can bodies.

19. Apparatus for expanding collapsed hollow metal bodies to a predetermined cross-sectional outline, for the purpose specified, comprising: substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies co-axially with respect thereto; means for intermittently operating said cams for this purpose; and means for removing undesired creases from the expanded bodies.

20. Apparatus for expanding collapsed hollow metal bodies to a predetermined cross-sectional outline, for the purpose specified, comprising; substantially wedge shaped members designed to enter the opposite ends of the collapsed bodies and co-operate to expand same to the desired outline; slidably and rotatably mounted blocks carrying said members; means for moving said blocks together with said members toward and away from each other; rollers mounted upon said blocks; slidably mounted cams designed to co-operate with said rollers to control the entry of said members into the collapsed bodies and ensure and permit of their withdrawal from the expanded bodies coaxially with respect thereto; frictional means operatively connecting said blocks to said cams; means for limiting the movement of said cams to cause said rollers to intermittently move thereon; and means for automatically pressing out undesired creases from said expanded can bodies prior to the withdrawal therefrom of said members.

21. An apparatus for expanding a flattened can body, comprising in combination a mandrel having a pair of spaced inwardly movable wedge shaped members, said members having their points directed inwardly and there being flat faces adapted for coaction between said points and the outer ends or bases of said members, said points being practically aligned on the horizontal plane of the axis of the mandrel and said points being adapted to enter opposite ends of said body between its flattened portions, so that during the inward movement the inner ends of said faces, being coincident with said points, may become slidably engaged, whereby said points may then travel along the coacting opposite faces to said respective bases, so that said members may provide opposed outer parallel surfaces within said body to expand the latter.

22. An apparatus for expanding flattened can bodies, comprising in combination a mandrel having spaced inwardly movable, rockable wedge shaped members the points of which are directed inwardly and practically aligned on the horizontal plane of the axis of said members, said members having the surfaces of their outer or base ends inclined from said plane and there being flat faces adapted for coaction between said points and said ends, said points being adapted to enter opposite ends of said bodies between their flattened portions, means for moving said members inwardly, and means for rocking said members, so that said surfaces may be urged into vertical position, whereby the inner ends of said faces, being coincident with said points, may become slidably engaged, so that said points may then travel along the coacting opposite faces to the respective end surfaces, whereby said members may form opposed outer parallel surfaces within said bodies to expand the latter.

23. An apparatus comprising in combination a support for a flattened can body, inwardly movable recessed plates, a mandrel including a pair of wedge shaped members, said members having their bases rigidly mounted on said plates and the points of said members being disposed adjacent said support, so that on movement of said plates said points may enter opposite ends of said body between the flattened portions thereof, and means for moving said plates with their mountings, whereby to expand said body and flange said ends.

24. An apparatus comprising in combination a movable support for a flattened can body, inwardly and outwardly movable plates, a mandrel including a pair of wedge shaped members, said members having their bases rigidly mounted on said plates and the points of said members being aligned opposite said support when said members are in the outer position, whereby on moving said plates inwardly said points may enter the ends of said body between the flattened portions thereof, means for moving said plates with their mountings inwardly, means for moving said support from beneath said body, whereby said points may be urged to the peripheries of said bases at opposite sides thereof for expanding said body, and means for moving said plates outwardly so as to cause the expanded body to drop gravitationally from said members.

25. In an apparatus of the class described comprising a pair of opposed relatively movable plates; a mandrel; said mandrel including a member having a base rigid with one of said plates, a point or edge disposed on the plane of one part of the periphery of said base, there being an inclined face between said point and the opposite part of said periphery; a second member having a base rigid with the other plate, a point or edge disposed on the plane of one part of the periphery of the second mentioned base, there being an inclined surface between the second mentioned point and the opposite part of the second mentioned periphery, so that said members may form a separable body having its outer surface in registry with said peripheries.

26. In an apparatus of the class described, in combination, a pair of relatively movable plates, a mandrel including a member having a base rigid with one of said plates, a second member rigid with the other plate, said bases having aligned peripheries, and separable mating faces disposed on said members and engageable throughout their areas whereby to form a body having its outer surface disposed in registry with said peripheries.

27. In an apparatus for expanding flattened can bodies, the combination of a pair of relatively movable opposed plates, a mandrel including a member having a base rigidly mounted on one of said plates, a point distant from said base and disposed opposite one portion of the periphery of said base, said member having a flat face disposed between said point and the opposite portion of said periphery; a second member substantially identical with the first member and having its base rigidly mounted on the other plate, said second member having the periphery of its base in registry with the first periphery and the point of said second member being disposed opposite the second mentioned portion of the first periphery, so that the faces of said members may be separably engaged to form a continuous surface around the mandrel; and means for moving said plates with their mountings.

CHARLES JOSEPH RHODES.